(12) United States Patent
Yucel et al.

(10) Patent No.: US 9,043,279 B1
(45) Date of Patent: May 26, 2015

(54) CLASS BASED STORAGE ALLOCATION METHOD AND SYSTEM

(75) Inventors: Sakir Yucel, Wexford, PA (US); Chatree Sangpachatanaruk, Wexford, PA (US)

(73) Assignee: NetApp, Inc., Sunnyvale, CA (US)

( * ) Notice: Subject to any disclaimer, the term of this patent is extended or adjusted under 35 U.S.C. 154(b) by 494 days.

(21) Appl. No.: 12/551,484

(22) Filed: Aug. 31, 2009

(51) Int. Cl.
   G06F 7/00 (2006.01)
   G06F 17/00 (2006.01)
   G06F 17/30 (2006.01)

(52) U.S. Cl.
   CPC .... *G06F 17/30864* (2013.01); *G06F 17/30699* (2013.01); *G06F 17/30705* (2013.01); *G06F 17/30722* (2013.01)

(58) Field of Classification Search
   None
   See application file for complete search history.

(56) References Cited

U.S. PATENT DOCUMENTS

| | | | |
|---|---|---|---|
| 5,144,692 A * | 9/1992 | Baker et al. | 710/240 |
| 7,644,228 B2 * | 1/2010 | Sicola | 711/112 |
| 7,873,619 B1 * | 1/2011 | Faibish et al. | 707/705 |
| 7,949,637 B1 * | 5/2011 | Burke | 707/655 |
| 8,024,442 B1 * | 9/2011 | Roussos et al. | 709/223 |
| 2004/0243699 A1 * | 12/2004 | Koclanes et al. | 709/224 |
| 2005/0172073 A1 * | 8/2005 | Voigt et al. | 711/114 |
| 2013/0024424 A1 * | 1/2013 | Prahlad et al. | 707/640 |

* cited by examiner

*Primary Examiner* — Loan T Nguyen
(74) *Attorney, Agent, or Firm* — LeClairRyan, a Professional Corporation (57) ABSTRACT

A method and system for allocating shared storage using one or more classification schemes is provided. One allocation method receives a storage request for provisioning storage from a class storage group configurable to share storage with more than one filesystems. Part of fulfilling this request includes associating a class and at least one corresponding storage allocation constraint with the storage request. The one or more storage allocation constraints can be used subsequently to determine if there is a sufficient amount of shared storage in the class storage group to fulfill the request. Accordingly, aspects of the present invention use at least one storage allocation constraint in determining if the storage allocation constraint for the class associated with the storage request allows allocation of shared storage to fulfill the request. When the storage allocation constraint allows, one implementation performs a provisioning of storage from the shared storage in class storage group.

12 Claims, 5 Drawing Sheets

CLASS BASED STORAGE ALLOCATION METHOD AND SYSTEM

BACKGROUND

It is currently difficult for rapidly growing enterprises to allocate storage from storage systems efficiently and economically. Administrators currently assign fixed amounts of storage to hundreds of different logical volumes and filesystems. In an attempt to meet short and medium term storage demand, the administrator may even intentionally over-allocate storage to each filesystem. Indeed, this method of allocating more storage than immediately needed keeps systems from running out of storage due to a sudden peak in the demand. More often than not, however, the excess storage goes unused and is wasted.

Meanwhile, it is also possible that other filesystems starve for additional storage resources. The administrator who underestimates the growth of a filesystem in an enterprise may have multiple problems to tackle. If the filesystem is almost full then it may not only run out of space but may become unstable or unreliable. The administrator may need to make a complete backup of the filesystem followed by a restoration of the filesystem. Increasing the filesystem size is both time consuming and risky as some data may be lost if the administrator is not careful.

Conventional storage allocation solutions may recognize the downside of wasting storage across in enterprise yet do not have solutions to this complex problem. Those actively administering storage systems need an alternative method to accurately allocate storage in rapidly growing filesystems without reconfiguring and risking data loss.

SUMMARY OF THE INVENTION

Aspects of the present invention provide a method and system for allocating shared storage using one or more classification schemes. One implementation of this allocation method includes receiving a storage request for provisioning storage from a class disk group (CDG) and then sharing the storage with one or more filesystems. A selected classification scheme determines how the one or many filesystems should share the requested storage. Part of fulfilling this request for storage includes associating a class and corresponding storage allocation constraint with the storage request. One or more storage allocation constraints can be used subsequently to determine if there is a sufficient amount of shared storage in the class storage group to fulfill the request. Accordingly, one aspect of the present invention uses at least one storage allocation constraint in determining if the storage allocation constraint for the class associated with the storage request allows allocation of shared storage to fulfill the request. Aspects of the present invention provision storage from the class disk group according to the one or more storage allocation constraints when the storage allocation constraints permit the allocation. Each of these storage allocation constraints are associated with different classes and applied in response to the storage request for a file system. Alternatively, it is also possible for aspects of the present invention to indicate that a request cannot be fulfilled due to a violation of a storage allocation constraint that cannot be resolved.

BRIEF DESCRIPTION OF THE DRAWINGS

The features of the present invention and the manner of attaining them, and the invention itself, will be best understood by reference to the following detailed description addend of embodiments of the invention, taken in conjunction with the accompanying drawings, wherein.

DETAILED DESCRIPTION

Aspects of the present invention provide a flexible and efficient method and system for allocating storage using a logical volume manager (LVM). Benefits provided by aspects of the present invention include, but are not limited to, at least one or more of the following mentioned herein below. In storage systems, the LVM may be configured to allocate storage among several filesystems according to a classification scheme and associated storage allocation constraints. In one implementation, the system classifies the filesystem and then uses the classification scheme to allocate storage based on the class association with each file system. The class associated with each filesystem determines how storage in the class disk group and class logical volume will be shared with other filesystems and shared storage in the class disk group.

Storage is generally conserved as the system administrator does not have to over-allocate or otherwise commit a certain amount of storage to any filesystem. Instead, a predetermined set of classifications storage allocation constraints guide how the storage is distributed across several file systems. The administrator allocates storage to multiple filesystems and then allows the classification scheme to guide how the storage is utilized. This is advantageous as the storage is shared among the filesystems on an as needed basis and not assigned to one person. Instead, a rapidly growing set of filesystems may share the storage in accordance with their respective classes and one or more storage allocation constraints.

Sharing storage between several filesystems also generally leads to lower amounts of fragmentation. One filesystem may grow more rapidly than predicted while another filesystem may grow more slowly. For example, one aspect of the present invention allows the faster growing filesystem to dynamically take up more storage than the slower growing systems. The rate storage is used or consumed by the several filesystems may be different than first predicted yet work without incident. Meanwhile, the storage is more accurately provided and smaller amounts of internally fragmented storage results.

Figure 1:
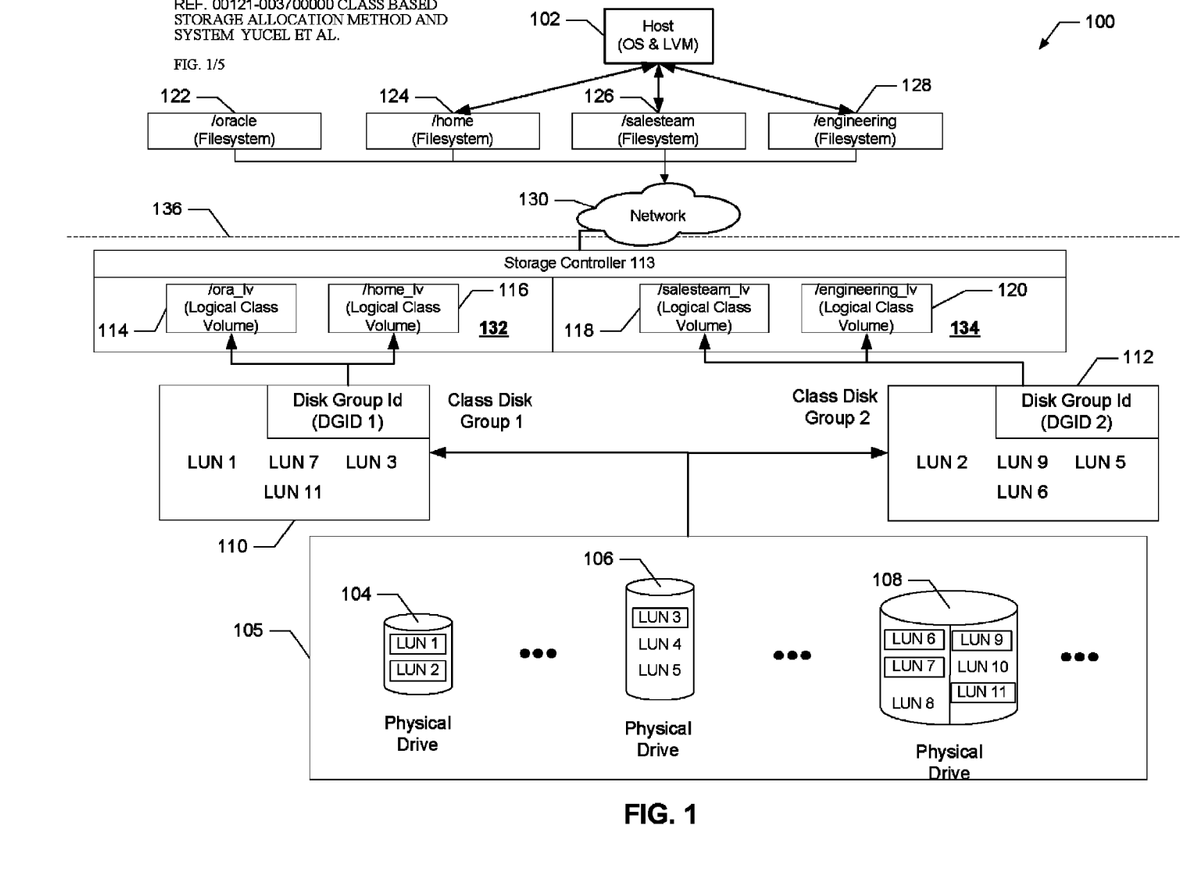
FIG. 1 is a schematic diagram illustrating an exemplary system and associated structures used to allocate shared storage to filesystems in accordance with aspects of the present invention.

FIG. 1 is a schematic diagram of an exemplary system 100 illustrating a number of structures associated with allocating shared storage to filesystems in accordance with aspects of the present invention. System 100 in FIG. 1 includes a host 102 capable of accessing through a storage controller 113 a subset of physical drives indicated as physical drive 104, physical drive 106 and physical drive 108. A logical volume manager (LVM) running within the operating system of host 102 facilitates the organization and abstraction of physical drives into logical units (LUN), class disk groups (CDG) and logical class volumes (LCV) and filesystems in accordance with aspects of the present invention. In this particular implementation, each physical drive may be divided into one or more LUNs and then grouped together into one or more class disk groups for allocation to one or more logical class volumes and corresponding filesystems.

Depending on the requirements, storage in each class disk group is divided up into one or more logical class volumes in accordance with one or more aspects of the present invention. The resultant logical class volumes are then mounted on mount points as filesystems as illustrated, for example, in FIG. 1. Storage from the class disk groups are distributed and shared across the logical class volumes and filesystems in accordance with various aspects of the present invention.

In one implementation, exemplary system 100 provides storage services to client 102 using storage area network (SAN), network addressable storage (NAS) or other storage technologies processed on one or multiple processors/cores. It is contemplated that a storage system 136 can use file-level servers such as used in a network-attached storage (NAS) environment, block-level storage servers such as used in a storage area network (SAN) environment, or other storage systems which are capable of providing both file-level and block-level service. Further, although the storage system 136 may be implemented as a single unit as illustrated in FIG. 1, it can also be implemented in a distributed architecture. For example, storage system 136 can be implemented as multiple distributed storage systems. It can also include a physically separate network module (e.g., "N-module") and disk module (e.g., "D-module") (not shown), which communicate with other storage systems over an external interconnect.

In a distributed architecture implementation, the N-module acts as a front-end of the storage system, exporting services to clients; and the D-module acts as the back-end, managing and implementing a parity declustered distribution of a RAID (redundant array of independent disks) organization on the underlying storage of the storage system. The N-module and D-module can be contained in separate housings and communicate with each other via network connections. Thus, the N-module and the D-module enable storage system 136 to be physically separated into multiple modules that can be distributed across a network. In one implementation, storage system 136 can include multiple N-modules and D-modules, each of the N-modules corresponding to one or more D-modules, and each of the D-modules corresponding to one or more N-modules.

Host 102 may be implemented as one or more computers or computer-like devices capable of accessing storage system 136 either directly or indirectly over a network 130. In general, host 102 may access storage system 136 over network 130 using wireless or wired connections supporting one or more point-to-point links, shared local area networks (LAN), wide area networks (WAN) or other access technologies. Host 102 may be accessing data, applications, raw storage or various combinations thereof stored on storage system 136.

Storage system 136 may include a single storage server 105 and corresponding storage devices 104, 106 through 108 as illustrated or multiple storage servers. In this example implementation, storage server 105 may be multiprocessor (MP) based using multiple distinct processors, multi-core processors and combinations thereof. It is further contemplated that the processes scheduled on the one or more processors of the storage server 105 may also use multiple threads and processes on the one or more processors to further increase the overall processing efficiency.

Storage server 105 may use a combination of software and hardware to provide storage services including the organization of information on storage devices 104, 106 through 108, such as disks. Storage server 105 may further be responsive to an operating system on host 102 that includes a file system to logically organize the information as a hierarchical or other structure of directories and files on the disks. Each "on-disk" file may be implemented as a set of disk blocks configured to store information, such as text or raw binary data whereas the directory may be implemented as a specially-formatted file in which information about other files and directories is stored. Further, the operating system on host 102 may be a general purpose operating system compatible with single-processor and multiple-processor (MP) configurations and may also include storage operating system functionality used to deliver storage and related services to one or more clients. It is further contemplated that portions of an operating system may be further included within storage controller 113 as well as elsewhere as needed in various portions of storage system 136.

As used herein, the term storage operating system generally refers to the computer-executable code operable in conjunction with a storage system that manages data access and client access requests and may implement file system semantics in certain implementations. The Data ONTAP™ storage operating system, available from NetApp, Inc. of Sunnyvale, Calif., which implements a Write Anywhere File Layout (WAFL™) file system, is an example of such a storage operating system implemented as a microkernel within an overall protocol stack and associated disk storage. The storage operating system can also be implemented as an application program operating within a general-purpose operating system, such as UNIX® or Windows NT®, or as a general-purpose operating system with configurable functionality for allocating storage as described herein.

In one implementation, storage devices 104, 106 and 108 may be implemented using physical storage disks and integrated into the LVM using logical class volumes, one or more class disk groups and other constructs. Physical drives may be configured with one or more logical units (LUNs) and then organized into a various number of class disk groups to define an overall logical abstraction and arrangement of storage space. Class disk groups may be further divided into logical class volumes and filesystems.

Logical class volumes in accordance with aspects of the present invention may be "loaded" in storage system 136 by copying the logical organization of the volume's files, data and directories into memory of storage system 136. Once a volume has been loaded in memory of a storage system 136, the volume may be "mounted" by one or more users, applications, or devices as long as they are permitted to access its contents and navigate its namespace. As used herein, a volume is said to be "in use" once it is loaded in a server's memory and at least one user or application has mounted the volume and accessed its contents.

As illustrated in FIG. 1, storage systems like storage system 136 may be configured to operate according to a client/server model of information delivery thereby allowing host 102 or multiple other hosts access to files simultaneously. In this model, host 102 may be a computer running an application, such as a file-system protocol, that connects to storage system 136 over a network 130 with point-to-point links, shared LAN, WAN, or VPN as implemented over a public network such as the Internet. Communications between storage system 136 and host 102 typically occurs as packets are sent over network 130. Hosts may request the services of storage system 136 by issuing storage-system protocol messages formatted in accordance with a conventional storage-system protocol, such as the Common Internet File System (CIFS) or Network File System (NFS) protocol.

In operation, host 102 makes a storage request to be fulfilled by at least one storage system 136. For example, the storage request may be a request for storage system 136 to read data, write data, delete data or other related operations on storage server 105. LVM on host 102 and storage controller 113 may work together or independently to allocate storage, deallocate storage, or access storage on one or more filesystems using a storage allocation method and system in accordance with aspects of the present invention. In one implementation, the storage allocation is shared across two or more file systems using a flexible and efficient classification scheme implemented in the LVM and elsewhere in storage system 136.

In this example, LUN 1, LUN 7, LUN 3 and LUN 11 are allocated from a combination of physical drive 104, physical drive 106 and physical drive 108 associated with storage system 105. The number and size of LUNs may be fixed for a particular operating system and LVM, may be specified by default or may be customized according to the particular application or usage. For example, a class disk group 110 illustrated in FIG. 1 having a disk group id (DGID 1) groups these aforementioned LUNs together for subsequent allocation by the operating system on host 102 and in conjunction with the LVM. As illustrated, the LVM has provisioned shared storage capacity allocated from disk group 110 into logical class volume 114 (/ora_lv) and logical class volume 116 (/home_lv) and likewise has also provisioned shared storage capacity allocated from disk group 112 into logical class volume 118 (/salesteam_lv) and logical class volume 120 (engineering_lv).

These logical class volumes are typically then mounted on specific mount points and made accessible to the operating system and applications running in the operating system environment on host 102. For example, an Oracle® (Oracle is a registered trademark of Oracle Corporation and/or its affiliates) database may run one or more database applications on host 102 in a production environment and use storage controller 113 to access the filesystem 122 when logical volume 114 "/ora_lv" is mounted on mount point "/oracle". Users may similarly access their personal files in their "home" directory stored in logical volume 116 labeled "/home_lv" and mounted on the mount point "/home" as filesystem 124. Likewise, files stored in logical volume 118 labeled "/salesteam_lv" and logical volume 120 labeled "/engineering_lv" may be accessed through filesystem 126 and filesystem 128 respectively when mounted on mount points "/salesteam" and "/engineering" respectively.

Aspects of the present invention advantageously facilitate provisioning and sharing of storage by multiple filesystems. Instead of dedicating a fixed amount of storage to each filesystem in advance, the shared storage is used by one or more filesystems according to a classification scheme and one or more storage allocation constraints. Accordingly, in the illustrated example in FIG. 1 logical class volume 114 /ora_lv and logical class volume 116 /home_lv share space allocated to class disk group 110 consistent with a storage allocation constraint 132. As will be described in further detail later herein, one or more different classification schemes and/or storage allocation constraints selected by a system administrator determine how the storage may be used by the one or several filesystems.

Class disk group 112 further exemplifies the flexibility and benefits associated with aspects of the present invention. This example illustrates that storage can be provisioned and shared between selected filesystems but not all filesystems in a particular configuration. The class disk group 112 in this example includes LUN2, LUN5, LUN6 and LUN9 are also provisioned from physical drive 104, physical drive 106 and physical drive 108. These LUNs may have different capacities and performance characteristics compared with LUNs specified as LUN 1, LUN 3, LUN 7 and LUN 11 found in class disk group 110. As illustrated, the logical class volume 118 /salesteam_lv and logical class volume /engineering_lv share space allocated to class disk group 112 according to a different storage allocation constraint 134. Of course, while storage allocation constraints 132 and 134 disallow the sharing of LUNs in class disk group 110 with LUNs in class disk group 112 it is contemplated that alternate implementations may allow sharing of all the LUNs from many class disk groups if that approach is desired.

Aspects of the present invention also advantageously reduce the complexity of allocating storage to one or more filesystems. As previously described, filesystems use storage as needed subject to one or more storage allocation constraints rather than fixed amounts of storage setup in advance. For example, the logical class volume /ora_lv may be classified to provide /oracle filesystem as much storage as required as long as it does not exceed more than 40% of the overall storage available in class disk group 110. Furthermore, this example configuration might allow /home_lv to provide the /home filesystem with 50% of the overall storage available from class disk group 110 also in a first-come-first-serve basis. As further described later herein, system administrators may quickly implement filesystem classifications and more sophisticated storage allocation constraints without increasing the overall complexity of allocating storage to one or hundreds of storage systems.

It should be appreciated that FIG. 1 provides merely one implementation of the present invention and many other implementations of the present invention are contemplated. For example, this particular filesystem design in FIG. 1 is described using physical drives, LUNs, class disk groups, logical class volumes and filesystems. However, it is contemplated that other implementations of the present invention could be adapted to work with many different types of filesystems using the same or similar functional equivalents as illustrated in FIG. 1. In some cases, it is possible that one or more of the components making up the filesystem in FIG. 1 are functionally combined together as wells as other cases where the function associated with one or more of the components in the filesystem in FIG. 1 are spilt up and distributed to different components. For example, LUNs and class disk groups may be combined together and described using a different terminology. In general, aspects of the present invention allow filesystems to share data allocations and aspects of the present invention may be applied to a variety of abstractions used to represent filesystems and other methods for organizing and accessing storage.

Figure 2:
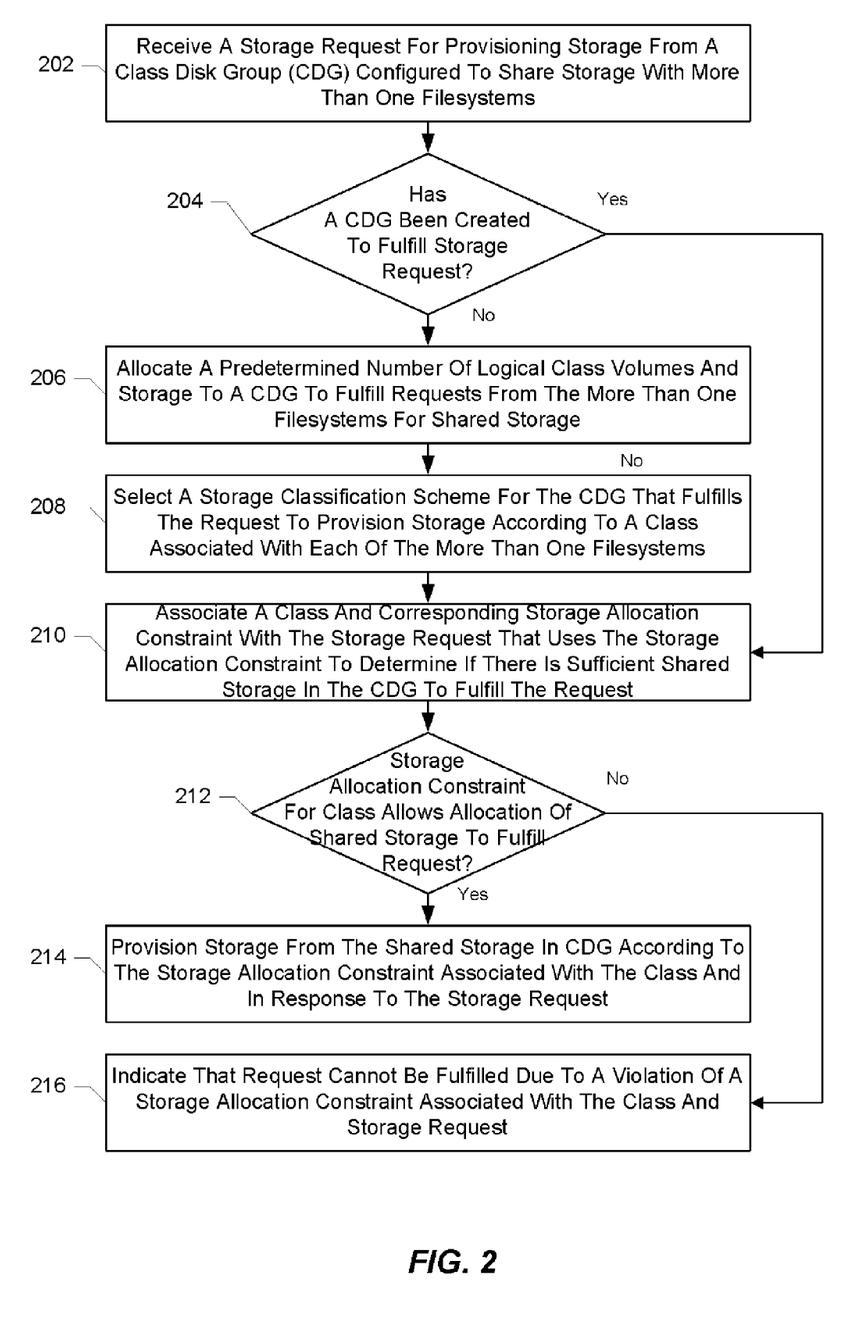
FIG. 2 is a flowchart diagram providing the operations for creating class based shared storage to one or more filesystems in accordance with aspects of the present invention.

Referring to FIG. 2, a flowchart diagram provides the operations for allocating shared storage to filesystems in accordance with one aspect of the present invention. Initially, the storage system receives a storage request for provisioning storage from a class disk group (CDG) configured to share storage with more than one filesystems (202). Storage from the class disk group is made available to one or multiple class logical volumes and is not limited to just one logical volume. For example, the storage request may occur when an application requests to read data, write data or potentially delete and return data to the respective class disk group.

In one implementation, the storage system may first determine if there is a class disk group with available storage to fulfill the storage request (204). In certain cases, the class disk group and corresponding storage from logical class volumes may need provisioning. If the class disk group has not yet been provisioned or created (204—No) then the storage system allocates a predetermined number of logical class volumes and storage to a class disk group (206). Since storage is shared, more than just one filesystem may eventually share the data provisioned for the class disk group and the one or more logical volumes. Aspects of the present invention typically do not provision storage to a single filesystem but to multiple filesystems and their respective corresponding logical class volumes by way of the class disk group.

Once the storage is provisioned to the class disk group and/or logical class volumes, the storage system selects a storage classification scheme for the class disk group and logical class volumes associated therewith (208). The storage classification scheme may be selected from one or more predetermined methods of sharing storage in accordance with various aspects of the present invention. Associated storage allocation constraints drive how the storage classification scheme shall share the provisioned storage with the various filesystems. In one implementation, the request to provision the storage also includes a request for a particular storage classification scheme for the shared storage. For example, the request for storage may also request that filesystems sharing the storage be allowed to use the maximum amount of storage available in the class disk group (i.e., a maximum allocation classification scheme).

Alternatively, a system administrator may classify the storage requests for certain filesystems in advance and according to a predetermined classification setup for the named filesystem. For example, the /home filesystem may be allowed to share no more than 20% of the total available storage in the class disk group. Other factors for selecting a classification scheme for the filesystems may include the processing priority of the application requesting the storage, the urgency of the need for storage under the circumstances or many other criteria. The storage is made available for provisioning to filesystems once the storage is allocated and a classification scheme for sharing the storage is selected.

In the event the class disk group and storage are available (204—Yes), the storage system then associates a class and corresponding storage allocation constraint with the storage request (210). The storage system uses the class and associated storage allocation constraint to determine if there is even the potential for sufficient shared storage in the class disk group to fulfill the request (212). If the amount of storage in the class disk group is too little or not available aspects of the present invention may fail to fulfill the storage allocation request (212—No). In one implementation, the storage system indicates that the request cannot be fulfilled due to a violation of a storage allocation constraint associated with the class and storage request (216) For example, the storage allocation constraint may limit allocating storage from logical class volume if the remaining storage on the class logical volume would not meet a minimum storage requirement.

Alternatively, the storage system may have sufficient storage resources to fulfill the request (212—Yes). In this case, aspects of the present invention proceed to provision storage from the shared storage in the class disk group (214). File systems use the shared storage in accordance with their respective class and corresponding one or more storage allocation constraints.

Figure 3:
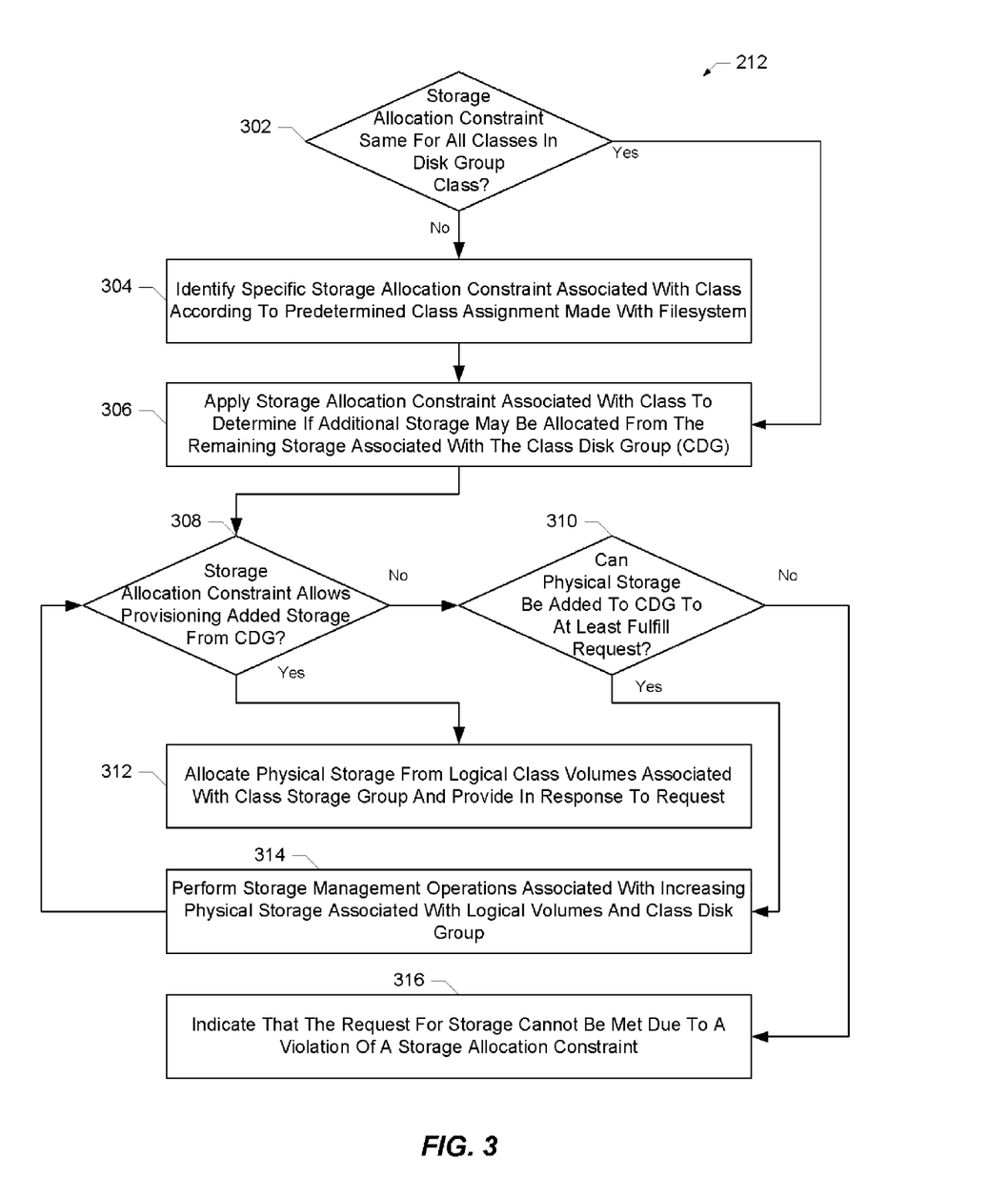
FIG. 3 is a flowchart diagram further detailing the operations for allocating shared storage for multiple filesystems in accordance with one aspect of the present invention.

FIG. 3 is a flowchart diagram illustration further detailing the operations for allocating shared storage for multiple filesystems in accordance with one aspect of the present invention. In this example, the storage system first determines if there are multiple classes in the class disk group and logical class volumes (302). For example, storage may be allocated in the same manner across two different filesystems if the storage allocation constraints are also the same (302—Yes). More typically, the classes and corresponding storage allocation constraints may be different for each filesystem (302—No). If there are multiple classes, the storage system identifies specific storage allocation constraints associated with a class and assigned to the filesystem (304). For example, one filesystem such as /home may be assigned a first classification with a storage allocation constraint allowing only 20% of the overall storage in the storage system. A second classification allowing 30% of the overall storage from the storage system may be assigned to a class associated with another filesystem such as /oracle (306).

Next, the storage system may apply storage allocation constraints associated with the class to determine if additional storage may be allocated from the remaining storage associated with the class disk group (CDG) (306). Based on the storage allocation constraint, aspects of the present invention may first determine if existing storage in the class disk group is sufficient to fulfill the request (308). In one implementation, it is not sufficient that storage is available in the class disk group unless the storage allocation constraint can also be met and fulfilled. If both the quantity of storage and the storage allocation constraints are met then (308—Yes) the storage system allocates physical storage from logical volumes already associated with class disk group and then provides the storage as requested (312).

However, if any required storage allocation constraints are not fulfilled then (308—No) a further determination is made to see if physical storage can be added to class disk group to at least fulfill the request (310). For example, a class disk group or logical class volume may have a storage allocation constraint restricting any portion of the last 100 Gigabytes of storage from being allocated to any filesystems in the class disk group. Thus, a request for even 200 M of the last 100 G in a class disk group would be initially denied as it would violate the storage allocation constraint for the classification in this example.

Aspects of the present invention prompt to arrange for increasing the total amount of physical storage available to the class disk group (310—Yes) and not to the individual filesystem requesting added storage. For example, the physical storage may be added using a robotic system that adds additional storage or alternatively may be added by a system administrator managing the storage systems. This approach is advantageous as multiple filesystems can automatically begin sharing the increased storage without reconfiguration of individual filesystems. It also simplifies storage management as a system administrator does not have to backup, configure, and then restore preexisting data to eliminate or reduce fragmentation.

With the physical storage added (310—Yes), the storage system then performs storage management operations associated with increasing physical storage associated with logical volumes, the class disk group and other constructs of the LVM (314). These operations may involve increasing the size of the class disk group and multiple logical class volumes and filesystems sharing the increased storage according to the classification. Alternatively, it is also possible that added storage may not be readily used in such a manner to meet the storage allocation constraints (310—No). If storage cannot be added then the storage system would indicate that the request for storage cannot be met for violation of one or more storage allocation constraints (316).

Figure 4A:
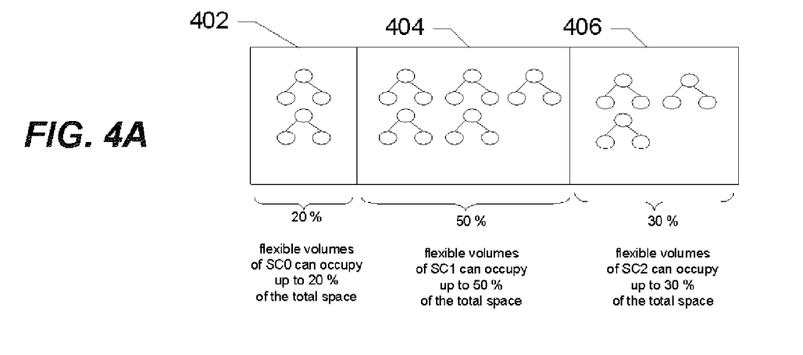
FIG. 4A represents a maximum storage allocation classification scheme in accordance with one aspect of the present invention.
Figure 4B:
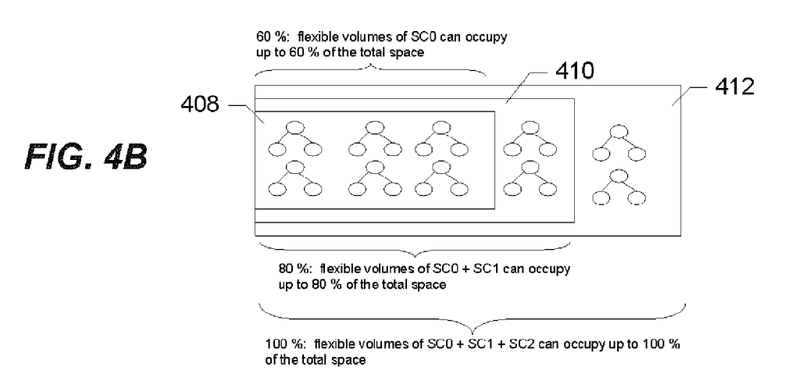
FIG. 4B represents another classification scheme with storage allocation constraints that limit the combined allocation of storage to different aggregate amounts in accordance with yet another aspect of the present invention.
Figure 4C:
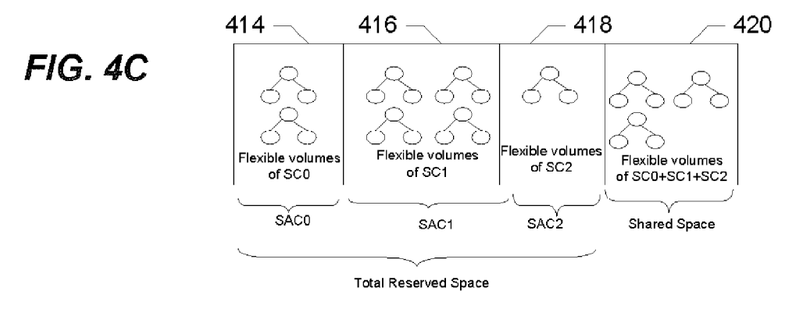
FIG. 4C illustrates a maximum storage allocation classification scheme for shared storage with an additional predetermined reservation in accordance with yet another aspect of the present invention.

Implementations of the present invention provide for allocating storage shared between multiple filesystems rather than a single filesystem. Storage is easier to manage using this approach as the administrator can assign classes to filesystems and not have to determine the exact amount of storage to allocate to each. A few of the classification schemes and storage allocation constraints are illustrated in FIG. 4A/B/C. The administrator merely selects from one or more classification schemes and the storage system determines how the storage is to be distributed and shared.

In this example, FIG. 4A represents a maximum allocation classification scheme in accordance with one aspect of the present invention. In this example classification approach the storage system allows each filesystem to allocate up to a percentage maximum of the available shared storage. For example, storage class 0 (SC0) allows filesystem 402 to only occupy up to 20% of the total available storage space. Storage class 1 (SC1), in this example, allows filesystem 404 only up to 50% of the total available storage and storage class 2 (SC2) allows filesystem 406 up to 30% of the total available storage space.

FIG. 4B represents another implementation with storage constraints that limit the combined allocation of storage to different aggregate amounts in accordance with aspects of the present invention. In this example, filesystem 408 is associated with storage class 0 (SC0), filesystem 410 associated with storage class 1 (SC1) and filesystem 412 associated with storage class 2 (SC2). According to storage access constraint 0 (SAC0), the filesystem 408 taken alone cannot exceed 60% of the total available storage. However, storage access constraint 1 (SAC1) further limits the total of filesystem 408 combined with filesystem 410 to a total of 80% of the total available storage. In accordance with SAC1 of this example, filesystem 408 might be limited to only have 40% of the total available storage if filesystem 410 happens to also have 40% of the total storage. Lastly, storage access constraint 2 (SAC2) might limit the allocation of storage to a combination of filesystem 408, filesystem 410 and filesystem 412. In this case, the total allocation of storage to these three filesystems may not exceed 100% of the total available storage.

Another aspect of the present invention illustrated in FIG. 4C provides a maximum allocation classification scheme with a predetermined reservation for shared storage. In this classification example, filesystem 414 is associated with storage class 0 (SC0) and storage access constraint 0 (SAC0) such that storage in filesystem 414 has a reserved 30% of available space. Filesystem 416 is classified with storage class 1 (SC1) and storage access constraint 1 (SAC1) such that it has reserved 40% of the available space and filesystem 418 is classified with storage class 2 (SC2) and storage access constraint 2 (SAC2) such that it has reserved 10% of the available space and filesystem. In one implementation as illustrated, the remaining unreserved amount of 20% of the total storage space is available to any of filesystems 414, 416, 418 through SC0+SC1+SC2 and shared space 420, on a first-come-first serve basis thereby allowing each filesystem to grow as needed.

Figure 5:
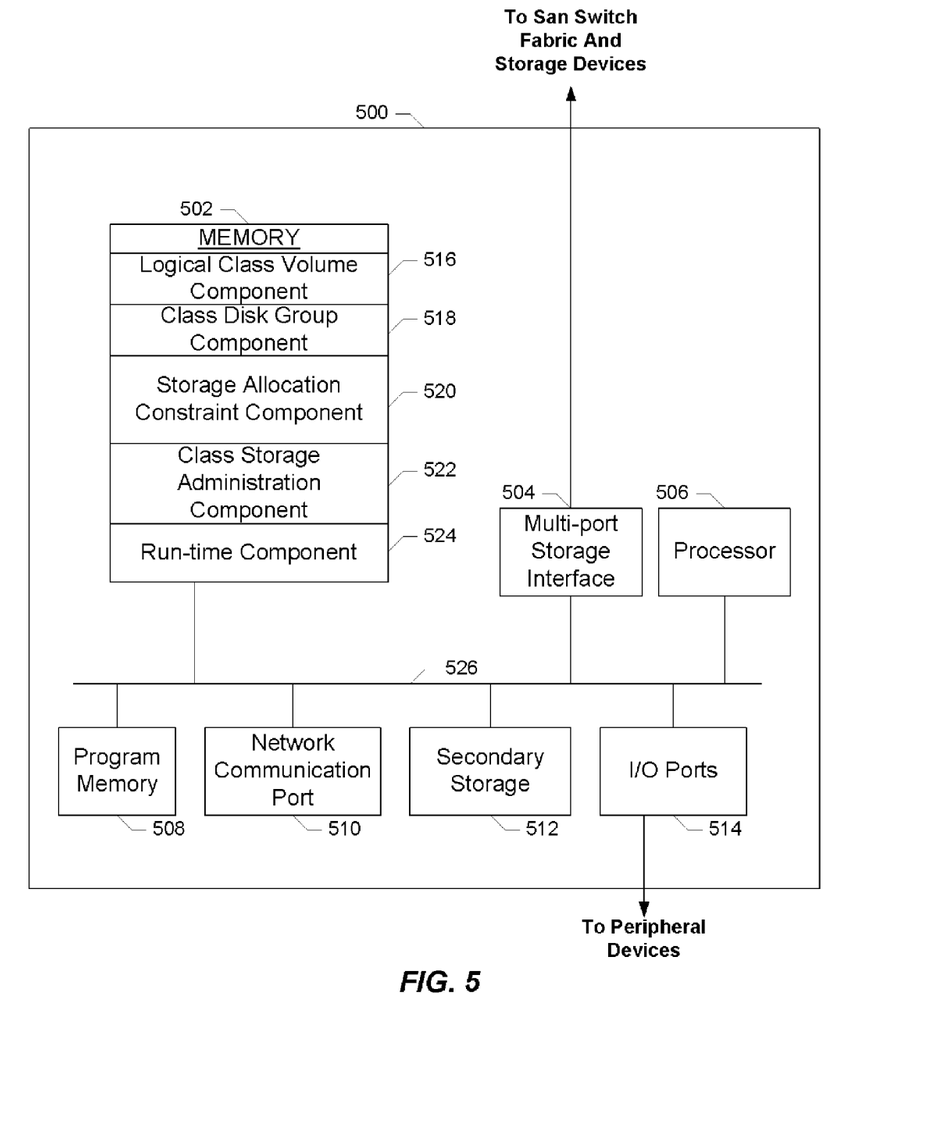
FIG. 5 is a block diagram illustration of the components used to implement a class based storage allocation system and methods in accordance with one implementation of the present invention.

In various implementations of the present invention, memory 502 holds a logical class volume component 516, class disk group component 518, storage allocation constraint component 520, class storage administration component 522 and a run-time component 524 for managing one or more of the above and other resources.

Logical class volume component 516 concerns sharing storage among the multiple logical class volumes according to one or multiple storage allocation constraints. Class disk group component 516 instead concerns operations associated with the sharing of storage at the disk group level of abstraction in a logical volume manager or other storage management framework. Storage allocation constraint component 520 may include a database of predetermined classification schemes in accordance with aspects of the present invention. It is also possible to create additional storage allocation constraints and keep them ready for use in the storage allocation constraint component 520. The ability to take one predetermined set of storage allocation constraints as a set of templates and then customized to fit different situations is also contemplated in accordance with aspects of the present invention. Class storage administration component 522 concerns increasing the size of physical storage on a system and also making sure the storage is shared in accordance with aspects of the present invention.

Multi-port storage adapter 504 cooperates with the storage operating system and run-time environment 524 executing on a storage server 500 to access information requested by the one or more clients. Resulting information may be stored on or retrieved from the storage devices attached to the storage server 500 or other nodes of a storage system via the multi-port storage adapter 504. The multi-port storage adapter 504 includes input/output (I/O) interface circuitry that couples to the storage devices over an I/O interconnect arrangement, such as a conventional high-performance, Fibre Channel serial link topology. One or more interconnects on the multi-port storage adapter 504 may be used to provide higher throughput and/or reliability. The information is retrieved by the multi-port storage adapter 504 and, if necessary, processed by the processor 506 (or the multi-port storage adapter processor associated with multi-port storage interface 504 itself) prior to being forwarded over interconnect 526 to the network communication port 510, where the information is formatted into one or more packets and returned to a requesting client.

The program memory 508 may be used to provide fault-tolerant backup of data, enabling the integrity of storage server transactions to survive a service interruption based upon a power failure, or other fault. The size of the program memory 508 is variable, although it is typically sized sufficiently to log a certain time-based chunk of transactions (for example, several seconds worth). In one implementation, system memory 508 is NVRAM and may store client requests corresponding to discrete client messages requesting file transactions such as "WRITE," "CREATE," "OPEN," and the like. Further, these entries may be logged in the NVRAM, e.g., according to the particular order they are completed. The use of the NVRAM for system backup and crash recovery operations is generally described in commonly assigned application Ser. No. 09/898,894, entitled "System and Method for Parallelized Replay of an NVRAM Log in a Storage Appliance" by Steven S. Watanabe et al. assigned to the assignee of the present invention and expressly incorporated herein by reference.

The network communication port 510 comprises the mechanical, electrical and signaling circuitry needed to connect the storage server 600 to clients over network 614, which may include a point-to-point connection or a shared medium, such as a LAN.

Secondary storage 512 may include a variety of storage devices including conventional magnetic tapes or disks, optical disks such as CD-ROM, DVD, magneto-optical (MO) storage or any other type of non-volatile storage devices suitable for storing large quantities of data. A CD-ROM, DVD or other non-volatile storage device along with a respective CD-ROM, DVD or other storage media can also be connected via I/O ports 514 to storage server 500. These various storage media may contain one or more implementations of the present invention tangibly embodied on the storage media with instructions capable of being executed on the processor 506. In one implementation, the storage devices are arranged into a plurality of volumes, each having at least one file system associated therewith to facilitate ready access and execution of these instructions.

Implementations of the present invention can configure the physical disks of storage devices associated with secondary storage 512 into RAID groups so that some disks store striped data and at least one disk stores separate parity for the data, in accordance with a RAID 4 configuration. However, other configurations (e.g. RAID 5 having distributed parity across stripes, RAID 0 mirroring and others) are also contemplated.

In general, implementations of the invention can be implemented in digital electronic circuitry, or in computer hardware, firmware, software, or in combinations of them. Apparatus of the invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high level procedural or object oriented programming language, or in assembly or machine language if desired; and in any case, the language can be a compiled or interpreted language. Suitable processors include, by way of example, both general and special purpose microprocessors. Generally, the processor receives instructions and data from a read only memory and/or a random access memory. Also, a computer will include one or more secondary storage or mass storage devices for storing data files; such devices include magnetic disks, such as internal hard disks and removable disks; magneto optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto optical disks; and CD ROM disks. Any of the foregoing can be supplemented by, or incorporated in, ASICs (application specific integrated circuits).

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents.

This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Unless otherwise specified, steps of a method claim need not be performed in the order specified. The invention is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A method comprising:

receiving, by a storage management computing device, a storage request for provisioning storage from a class device group configured for shared storage with one or more filesystems;

allocating, by the storage management computing device, a predetermined number of logical class volumes and storage to the class device group to fulfill the storage request for shared storage with the one or more filesystems;

selecting, by the storage management computing device, a storage classification scheme for the class device group used to fulfill the storage request to provision storage according to a class associated with each of the one or more filesystems;

associating, by the storage management computing device, the class and a corresponding storage allocation constraint with the storage request, wherein the storage allocation constraint further determines when the one or more filesystems will share storage when the storage request is fulfilled;

determining, by the storage management computing device, when the corresponding storage allocation constraint for the class associated with the storage request allows allocation of shared storage to fulfill the storage request, the determining further comprising determining when the class and storage allocation constraint associated with the storage request has a predetermined dedicated storage available to fulfill the storage request from one or more logical class volumes in a class device group and identifying the storage request as fulfillable using shared storage in addition to the predetermined dedicated storage from one or more logical class volumes in the class device group and in accordance with the class and storage allocation constraint associated with the storage request;

provisioning, by the storage management computing device, the storage from the shared storage according to the storage allocation constraint associated with the class when the storage allocation constraint allows allocation of shared storage to fulfill the storage request; and indicating, by the storage management computing device, the storage request cannot be fulfilled when the storage allocation constraint associated with the class does not allow allocation of shared storage to fulfill the storage request.

2. The method of claim 1 wherein the predetermined dedicated storage is specified as a percentage of total storage made available in a logical class volume and increases in size when additional storage is made available within the class device group and corresponding logical class volume.

3. The method of claim 1 wherein the shared storage is specified as a percentage of the total storage made available in a logical class volume to the one or more filesystems on a first-come-first-serve basis and increases in size when additional storage is made available within the class device group and corresponding logical class volume.

4. The method of claim 1 wherein the logical class volume includes storage allocated to the one or more filesystems according to one or more storage allocation constraints.

5. A storage management computing device comprising:
a processor;
a memory coupled to the processor which is configured to be capable of executing programmed instructions comprising and stored in the memory to:
receive a storage request for provisioning storage from a class device group configured for shared storage with one or more filesystems;
allocate a predetermined number of logical class volumes and storage to the class device group to fulfill the storage requests with the one or more filesystems;
select a storage classification scheme for the class device group that fulfills the storage request to provision storage according to a class associated with each of the one or more filesystems;
associate the class and a corresponding storage allocation constraint with the storage request, wherein the storage allocation constraint determines when the one or more filesystems will share storage when the storage request is fulfilled;
determine when the corresponding storage allocation constraint for the class associated with the storage request allows allocation of shared storage to fulfill the storage request, the determining further comprising determining when the class and storage allocation constraint associated with the storage request has a predetermined dedicated storage available to fulfill the storage request from one or more logical class volumes in a class device group and identifying the storage request as fulfillable using shared storage in addition to the predetermined dedicated storage from one or more logical class volumes in the class device group and in accordance with the class and storage allocation constraint associated with the storage request;
provision storage from the shared storage according to the storage allocation constraint associated with the class when the storage allocation constraint allows allocation of shared storage to fulfill the storage request; and
indicate that the storage request cannot be fulfilled when the storage allocation constraint associated with the class does not allow allocation of the shared storage to fulfill the storage request.

6. The device of claim 5 wherein the predetermined dedicated storage is specified as a percentage of total storage made available in a logical class volume and increases in size when additional storage is made available within the class device group and corresponding logical class volume.

7. The device of claim 5 wherein the predetermined shared storage is specified as a percentage of the total storage made available in a logical class volume to the one or more filesystems on a first-come-first-serve basis and increases in size when additional storage is made available within the class device group and corresponding logical class volume.

8. The device of claim 5 wherein the logical class volume includes storage allocated to the one or more filesystems according to one or more storage allocation constraints.

9. A non-transitory computer readable medium having stored thereon instructions for allocating storage in a storage system comprising machine executable code which when executed by at least one processor, causes the processor to perform steps comprising:
receiving a storage request for provisioning storage from a class device group configured for shared storage with one or more file systems;
allocating a predetermined number of logical class volumes and storage to the class device group to fulfill the storage request for shared storage with the one or more filesystems;
selecting a storage classification scheme for the class device group used to fulfill the storage request to provision storage according to a class associated with each of the one or more filesystems;
associating the class and a corresponding storage allocation constraint with the storage request, wherein the storage allocation constraint further determines when the one or more filesystems will share storage when the storage request is fulfilled;
determining when the corresponding storage allocation constraint for the class associated with the storage request allows allocation of shared storage to fulfill the storage request, the determining further comprising determining when the class and storage allocation constraint associated with the storage request has a predetermined dedicated storage available to fulfill the storage request from one or more logical class volumes in a class device group and identifying the storage request as fulfillable using shared storage in addition to the predetermined dedicated storage from one or more logical class volumes in the class device group and in accordance with the class and storage allocation constraint associated with the storage request;
provisioning the storage from the shared storage according to the storage allocation constraint associated with the class when the storage allocation constraint allows allocation of shared storage to fulfill the storage request; and
indicating the storage request cannot be fulfilled when the storage allocation constraint associated with the class does not allow allocation of shared storage to fulfill the storage request.

10. The medium as set forth in claim 9 wherein the predetermined dedicated storage is specified as a percentage of total storage made available in a logical class volume and increases in size when additional storage is made available within the class device group and corresponding logical class volume.

11. The medium as set forth in claim 9 wherein the shared storage is specified as a percentage of the total storage made available in a logical class volume to the one or more filesystems on a first-come-first-serve basis and increases in size when additional storage is made available within the class device group and corresponding logical class volume.

12. The medium as set forth in claim 9 wherein the logical class volume includes storage allocated to the one or more filesystems according to one or more storage allocation constraints.

* * * * *